United States Patent [19]

Bush

[11] Patent Number: 4,858,731

[45] Date of Patent: Aug. 22, 1989

[54] COMPOSITE BRAKE DRUM

[75] Inventor: John W. Bush, Livonia, Mich.

[73] Assignee: The Budd Company, Troy, Mich.

[21] Appl. No.: 218,867

[22] Filed: Jul. 14, 1988

[51] Int. Cl.$^4$ ............................................. F16D 65/10
[52] U.S. Cl. ............................... 188/218 R; 192/107 M
[58] Field of Search ................... 188/73.1, 218 R, 218; 192/107 M

[56] References Cited

U.S. PATENT DOCUMENTS

| 1,947,782 | 2/1934 | Lejeune | 188/218 R |
| 2,081,605 | 5/1937 | Sinclair | 188/218 R |
| 2,824,229 | 7/1958 | Whitfield | 188/218 R |

FOREIGN PATENT DOCUMENTS

| 472398 | 3/1951 | Canada | 188/218 R |
| 1101209 | 4/1955 | France | 188/218 R |

Primary Examiner—Duane A. Reger
Attorney, Agent, or Firm—Harness, Dickey & Pierce

[57] ABSTRACT

A composite brake drum particularly adapted for motor vehicle applications. The brake drum includes a reinforcement assembly embedded within the cylindrical portion of the drum. The reinforcement assembly is preferably made from steel wire stock and includes a plurality of circular closed rings spaced axially within the brake drum cylindrical portion. axially extending locator wires are mechanically fastened to the reinforcing rings and serve to locate the rings. Loops can be formed on the locator wires for positioning the reinforcement assembly within a casting mold cavity to enable the device to be essentially self-locating within the mold. The composite brake drum is fabricated by pouring iron into the mold and then finish machining operations are performed.

11 Claims, 2 Drawing Sheets

COMPOSITE BRAKE DRUM

BACKGROUND AND SUMMARY OF THE INVENTION

This invention relates to a brake drum particularly adapted for motor vehicles and being reinforced with an embedded reinforcement member to provide a composite structure.

Brake drums used for motor vehicles such as heavy duty trucks are typically formed by casting grey iron and machining the casting in areas where precision dimensions and surfaces are required. Although iron brake drums perform satisfactorily, designers of braking systems are constantly striving for enhanced performance, lower cost, increased fatigue life and lighter weight. One particular shortcoming of conventional all-iron drums is their susceptibility to heat checking and crack formation which can lead to ultimate failure of the drum.

As a means for providing an improved brake drum, composite structures are known according to the prior art in which steel is incorporated into an iron brake drum reinforcement. For example, in accordance with U.S. Pat. No. 2,316,029, a bell-shaped stamped sheet metal housing is provided having an iron inner portion forming the friction surface of the drum which is centrifugally cast in place. Although drums of this construction operate satisfactorily, the location of the steel reinforcing layer is not optimized since the higher bending stresses imposed on the brake drum by the brake shoes are very close to the inside cylindrical surfaces of the braking surface where the reinforcement of steel can be most advantageously used. Moreover, the process of manufacture of such a drum would require specialized machinery and processing steps. Another approach used in the past is to provide an externally applied reinforcing member such as a steel band as taught by U.S. Pat. No. 3,841,448. This approach also requires specialized fabrication equipment and further does not optimally locate the steel reinforcing member. Moreover, the interface surfaces between the drum and reinforcement need to be precision machined and providing a good bond between the parts can be difficult. A steel wire ring is embedded within an iron brake drum structure according to U.S. Pat. No. 2,111,709. Although this structure would likely provide improvements over an all-iron brake drum according to the prior art, the reinforcement provided by the single ring is positioned only to reinforce the open mouth of the brake drum. In additional, no means for positioning the reinforcing member during the molding process is disclosed by this patent. The large cross-sectional area of a single reinforcing ring could further lead to poor bonding between the iron and steel ring due to the heat sink imposed by the ring.

In accordance with this invention, an improved composite brake drum is provided which achieves a number of significant benefits over prior art cast brake drums. The brake drum according to this invention employs a cage-like reinforcement assembly preferably made from steel wire which is cast in place to be substantially embedded within a grey iron brake drum. Locating means are provided to enable the reinforcement structure to be accurately positioned with respect to the mold cavity during casting. Since the steel material of the reinforcing assembly has a considerably higher modulus of elasticity then grey iron, the reinforcement increases the strength of the composite drum structure, thus decreasing mechanical deflection in response to loading. This reinforcement also reduces the generation of surface checks and cracks which can propagate to ultimately cause mechanical failure of the brake drum. The increased strength of the composite further enables a decrease quantity of iron necessary to provide a given strength brake drum, thus resulting in a lighter weight brake drum structure. The reinforcement assembly further locates reinforcing sections close to the friction surfaces of the drum where it is most advantageously positioned for structural efficiency. The axial extent of the reinforcing member serves to reinforce the brake drum across the entire depth of the friction braking surface. Significantly, the composite brake drum according to this invention can be fabricated using conventional sand casting processes with minimal variations, thus saving the cost of retooling. Due to the fact that the metal reinforcing sections according to the invention are distributed, relatively small diameters of wire can be used which enables the wire to be rapidly heated to near the temperature of the molten iron being poured into the casting mold, thus producing good fusion between the iron and embedded steel reinforcement.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
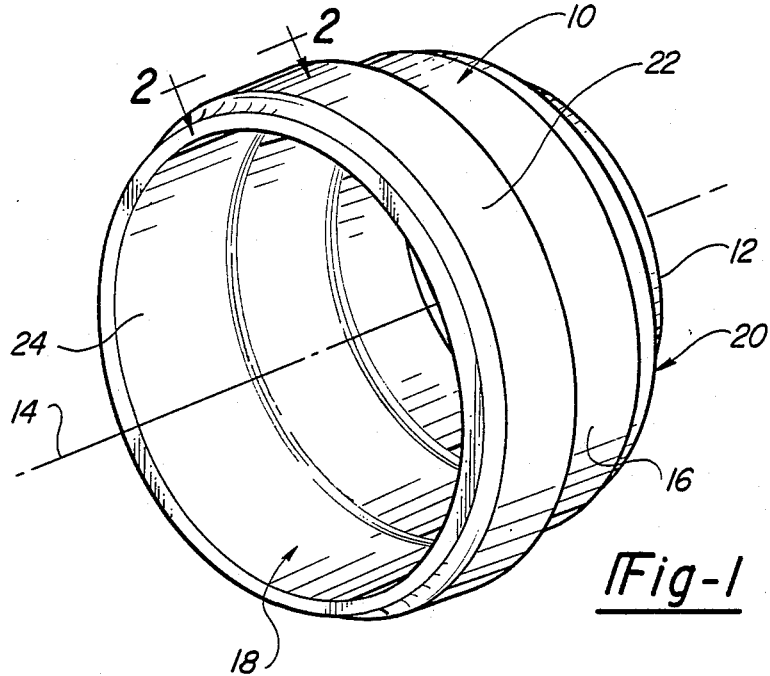
FIG. 1 is a pictorial view of a heavy duty motor vehicle brake drum having a composite structure in accordance with this invention.
Figure 2:
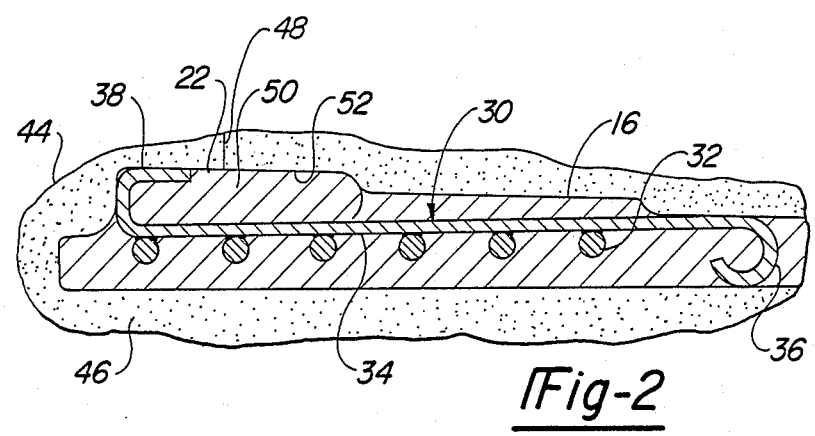
FIG. 2 is a cross-sectional view generally taken along the line 2—2 showing a portion of the brake drum as it is formed through casting processes.
Figure 3:
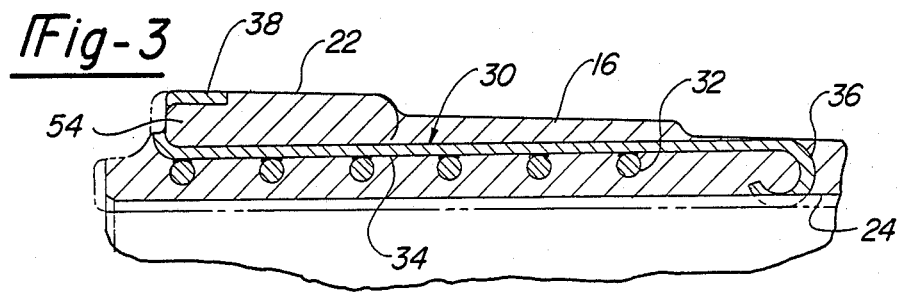
FIG. 3 is a view similar to FIG. 2 but showing the brake drum after finishing machining operations.

A composite brake drum in accordance with this invention is best shown in FIGS. 1 through 3 and is generally designated by reference number 10. Drum 10 has a mounting plate portion 12 configured to enable drum 10 to be mounted to a motor vehicle axle structure (not shown) for rotation about axis of rotation 14. Mounting plate portion 12 merges into cylindrical side portion 16, thus forming open end 18 and closed end 20. A so-called "squeal band" 22 is positioned adjacent open end 18 and is a radially thickened portion of the brake drum. The inside cylindrical friction surface 24 of drum 10 is engaged by expanding brake shoes of a conventional drum type braking system.

Figure 4:
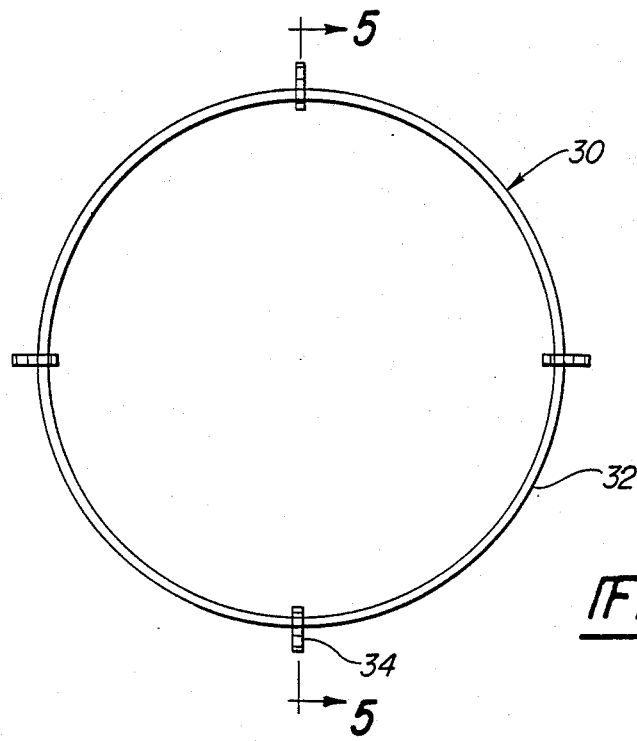
FIG. 4 is a side view of a reinforcement assembly according to this invention.
Figure 5:
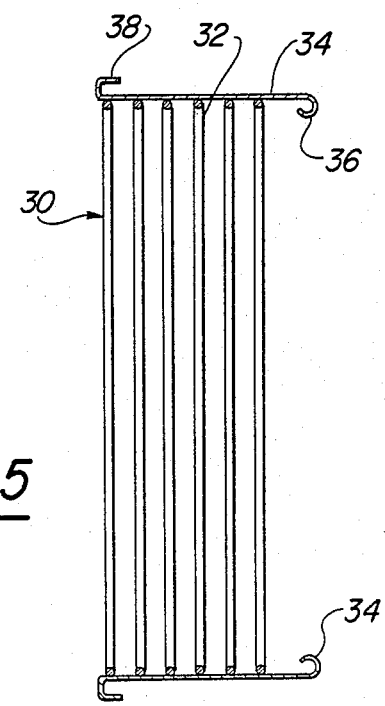
FIG. 5 is a cross-sectional view taken along line 5—5 of FIG. 4.

FIGS. 4 and 5 illustrate the configuration of reinforcement assembly 30 in accordance with this invention. Reinforcement assembly 30 includes a plurality (six shown) of closed circular wire rings 32 made of steel wire stock. Axially extending locator wires 34 are provided at circumferentially displaced positions as shown in FIG. 4. Locator wires 34 are bonded or otherwise affixed to rings 32, for example, by forming them integrally, brazing, welding, soldering, adhesives, etc. Locator wires 34 have a radially inwardly turned loop 36 at one axial end and radially outwardly turned loop 38 at their opposite axial ends.

FIG. 2 illustrates a process of casting brake drum 10. As shown, a pair of sand cast molds halves 44 and 46 are provided which are separated at parting line 48. Mold cavity 50 defines the outer surface shape of brake drum 10. As shown, reinforcement assembly 30 is positioned between mold halves 44 and 46 such that loop 36 is in contact with both of the mold halves, and loop 38 fits within pocket 52 for forming squeal band 22. The provision of loops 36 and 38 positively orients and locates reinforcement assembly 30 with respect to the configuration of brake drum 10. Once reinforcement assembly 30 is positioned within mold cavity 50 as shown, molten iron can be poured into the mold substantially embedding the reinforcement assembly.

FIG. 3 is a cross-sectional view through brake drum 10 after finish machining operations are completed with phantom lines showing the outline of the raw casting of the part. As shown, friction surface 24 is machined to form an accurate inside bore which involves machining away a portion of loop 36. Although iron is a superior material for forming friction surface 24, the minute cross-sectional area of exposed steel caused by machining into loop 36 does not produce adverse consequences. Rim surface 54 is also machined away and causes a portion of loop 38 to be removed.

The structural benefits provided by composite brake drum 10 as compared with conventional cast brake drums are manyfold. The ultimate tensile strength of grey iron is much less than that of steel and, accordingly, the steel of reinforcement assembly 30 provides enhanced mechanical strength for the drum. The structure is also stiffer since the modulus of elasticity for steel is about twice that of grey iron (i.e., 30 million psi and 15 million psi, respectively). Due to the increased modulus of elasticity of steel, the steel carries a disproportionately high fraction of the total load exerted on the brake drum as compared with its cross-sectional area. Accordingly, when steel is substituted for grey iron within brake drum 10, the stress in the iron will be reduced and the stiffness of the composite will be enhanced as compared to that of iron alone. The benefits to be derived from such a composite structure include a reduction in brake actuator travel on a vehicle and a higher tolerance to brake lining wear. In addition, such a reduction in stress retards crack initiation and propagation.

The configuration of reinforcement assembly 30 in accordance with this invention further provides structural benefits in that rings 32 are located close to friction surface 24. Although stresses are applied onto a brake drum in numerous directions, a significant load is exerted on cylindrical side portion 16 of the drum in response to the radially outward travel of the brake shoes. Such a load places a tensile stress along friction surface 24 and a tensile stress on the outer radial surface of drum side portion 16. The steel making up rings 32 has excellent tensile strength in extension and thus can restrain such forces far better than ordinary grey iron which has a fairly low extension tensile strength.

While the above description constitutes the preferred embodiments of the present invention, it will be appreciated that the invention is susceptible to modification, variation and change without departing from the proper scope and fair meaning of the accompanying claims.

What is claimed is:

1. A composite brake drum for a motor vehicle comprising:
    a mounting plate portion for mounting said drum to a motor vehicle axle structure for rotation about an axis of rotation, and
    a cylinder side portion joining said mounting plate portion defining an open and closed end of said drum and forming an inside cylindrical braking friction surface, said cylindrical portion having a reinforcing member substantially embedded within iron and formed of bands wrapping more than one turn around said drum about said axis of rotation and wherein adjacent turns of said bands are axially separated along said axis of rotation and are connected together by two or more axially extending locator wires and wherein said locator wires have at least one end extending axially beyond said bands for positioning said reinforcing member in a casting mold.

2. A composite brake drum for a motor vehicle according to claim 1 wherein said end of said locator wires forms a peeled end for positioning said reinforcing member in said casting mold.

3. A composite brake drum for a motor vehicle according to claim 1 wherein said reinforcing member comprises at least three of said locator wires equally angularly spaced about the circumference of said loops.

4. A composite brake drum for a motor vehicle according to claim 2 wherein said locator wires form looped ends at both their ends for positioning said reinforcing member in a casting mold.

5. A composite brake drum for a motor vehicle according to claim 1 wherein said wire bands are axially spaced such that a portion of said bands is adjacent said drum open end, and another portion of said bands is adjacent said drum closed end.

6. A composite brake drum for a motor vehicle according to claim 1 wherein said lcoator wires are welded to said bands.

7. A composite brake drum for a motor vehicle comprising:
    a mounting plate portion for mounting said drum to a motor vehicle axle structure for rotation about an axis of rotation,
    a cylindrical side portion joining said mounting plate portion defining an open and closed end of said drum and forming an inside cylindrical fiction surface, said side portion having a reinforcing assembly therein made from steel wire and substantially embedded within iron, said reinforcing assembly having two or more circular closed loops connected together by two or more axially extending locator wires supporting said loops at axially separated positions, said locator wires having at least one looped end for positioning said reinforcing assembly within a casting mold.

8. A composite brake drum for a motor vehicle according to claim 7 wherein said reinforcing member comprises three of said locator wires equally angularly spaced about the circumference of said loops.

9. A composite brake drum for a motor vehicle according to claim 7 wherein said locator wires form looped ends at both their ends for positioning said reinforcing member in a casting mold.

10. A composite brake drum for a motor vehicle according to claim 7 wherein said wire loops are axially spaced such that one of said loops is adjacent said drum open end, and one of said loops is adjacent said drum closed end with at least one of said loops positioned therebetween.

11. A composite brake drum for a motor vehicle according to claim 7 wherein said locator wires are welded to said loops.

* * * * *

UNITED STATES PATENT AND TRADEMARK OFFICE
CERTIFICATE OF CORRECTION

PATENT NO. : 4,858,731

DATED : August 22, 1989

INVENTOR(S) : John W. Bush

It is certified that error appears in the above-identified patent and that said Letters Patent is hereby corrected as shown below:

Abstract, line 7,
"axially" should be --Axially--

Column 4, line 25,
"peeled" should be --looped--

Column 1, line 68,
"then" should be --than--

Signed and Sealed this

Fourteenth Day of January, 1992

Attest:

HARRY F. MANBECK, JR.

*Attesting Officer*  *Commissioner of Patents and Trademarks*